Dec. 18, 1928.  
P. K. SAUNDERS  
1,696,017  
PISTON FOR USE IN THE CYLINDERS OF INTERNAL COMBUSTION ENGINES  
Filed Oct. 7, 1926

Witness:  
Otto Hauning.

Inventor:  
Philip Keith Saunders.

Patented Dec. 18, 1928.

1,696,017

UNITED STATES PATENT OFFICE.

PHILIP KEITH SAUNDERS, OF JOHANNESBURG, TRANSVAAL, SOUTH AFRICA.

PISTON FOR USE IN THE CYLINDERS OF INTERNAL-COMBUSTION ENGINES.

Application filed October 7, 1926, Serial No. 140,019, and in the Union of South Africa August 11, 1926.

This invention relates to pistons for use in the cylinders of internal combustion engines such as automobile engines, and consists of what I will designate a "built-up" or bimetallic piston.

The principal object of the invention is to combine the close-fitting and hard-wearing qualities of, for example, the ordinary cast iron piston with the conductivity and lightness of, for example, the known aluminium piston.

As is well known, the principal disadvantages of the all cast iron piston as compared with aluminium or other comparatively light pistons are that its greater weight lowers the efficiency of the engine; that it increases the wear and tear on gudgeon-pin and crank shaft bearings; and that for a given engine running at a given speed it causes a relatively greater amount of vibration in the engine.

On the other hand, the aluminium piston gives greater power in a given engine, but aluminium has a triple disadvantage that it does not wear well; that it wears out the cylinder walls; and that it has a very high coefficient of expansion, which means that in order to be a free fit in the cylinder when the piston is at its maximum attainable temperature, it must be an extremely loose fit under more normal conditions, and especially so when cold. This looseness causes an undesirable "slapping" in the engine and undue wear and tear on the piston rings. Alternatively, if the pistons are a tight fit in the cylinder when cold, they are usually "split" so as to allow for expansion, and the effect of this is to cause undue wear on the cylinders and pistons.

Broadly my invention may be stated to consist in combining in a built-up piston parts made of two different metals or alloys, one having the requisite or desirable close-fitting and hard-wearing properties or qualities of cast iron and the other the conductivity and lightness of aluminium; and in designing, constructing and assembling the parts of the piston in such a way as to produce a practicable and efficient piston.

According to this invention the piston consists of a head or crown of a light metal or alloy, and a skirt or slipper of the other and/or heavier metal or alloy. In such a built-up piston the head or crown is free to expand or contract without causing undue distortion in the skirt or slipper. The aforesaid parts or portions are rigidly connected together in such a way as to preclude all reasonable possibility of their working loose relatively to each other under normal working conditions. An advantage of a piston designed as shown in the accompanying drawings and hereinafter described is that it can be produced in quantity at little or no extra cost as compared with the conventional pistons now commonly in use.

In the accompanying drawings I illustrate a practical embodiment of the invention, wherein Fig. 1 is a half-sectional elevation of the complete piston arranged in operative position relative to the cylinder walls.

Figure 1:
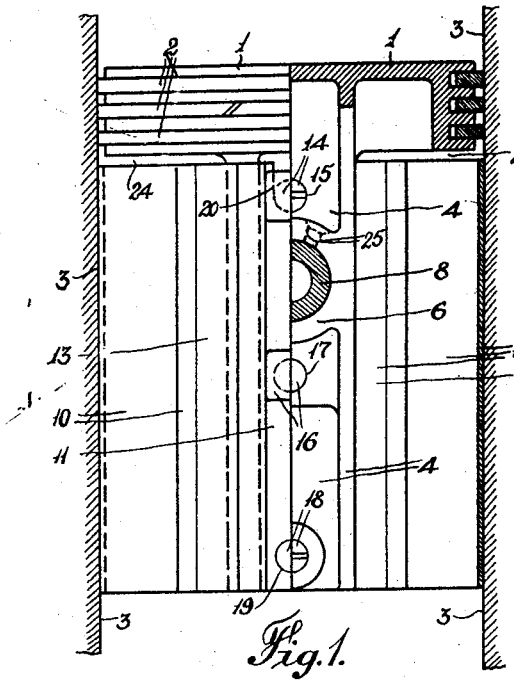

In the drawings the head or crown is denoted by the numeral 1. It may be made of aluminium or other suitable light metal or alloy, and carries or is fitted with the conventional or other suitable piston rings 2. The head 1 is of such a diameter that it is just clear of the cylinder walls 3 at its maximum temperature. The head 1, as shown, is constructed with two diametrically opposed depending lugs or downwardly projecting parts 4, 5. The lugs or parts 4, 5, which are each constructed with a hollow boss 6, 7, respectively, to carry the gudgeon-pin 8, are shown grooved, recessed or shaped on their outer faces, as indicated at 9.

10 is the skirt or slipper which is constructed of substantially cylindrical shape and is fashioned with two diametrically opposed longitudinal ribs or projections 11 on the inside thereof, which accurately fit the grooves 9 in the lugs 4, 5, when the skirt or slipper 10 is arranged in position around said lugs or projections 4, 5.

Figure 2:
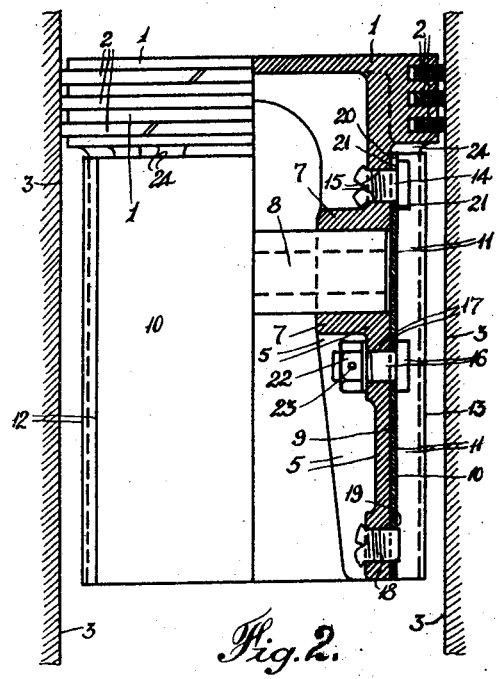
Fig. 2 is a half-sectional elevation at right angles to Fig. 1.
Figure 3:
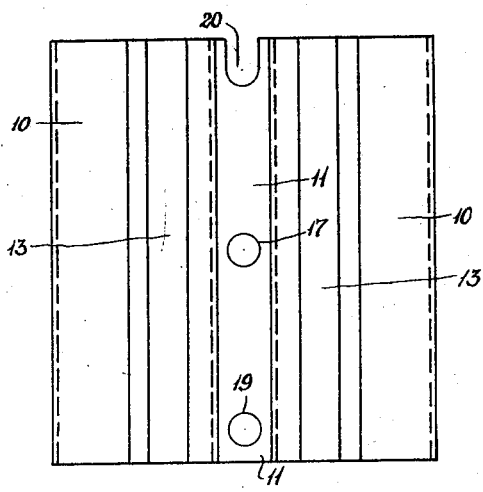
Fig. 3 is an elevation of the skirt or slipper detached.
Figure 4:
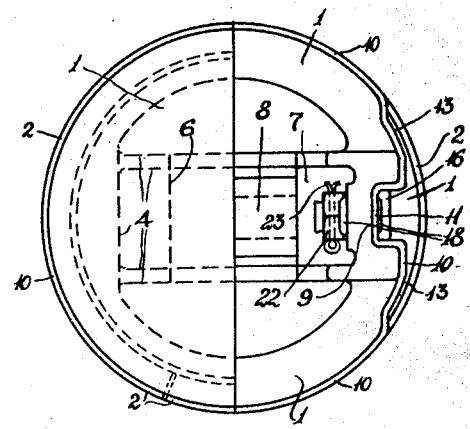
Fig. 4 is a view of the piston showing one half in plan as seen from the top of the piston, and the other as seen from the other end.

The skirt or slipper 10 may be made of steel, bronze, cast iron, or any other hard and strong metal or alloy of good wearing qualities and preferably having a relatively low coefficient of expansion. Said skirt or slipper 10, as previously described, is fashioned or formed of cylindrical shape for the greater portion of its surface and with two, more or less flattened, diametrically opposed portions 12, 13, in which are formed the internally projecting ribs or projections 11 which fit the longitudinal grooves 9 in the lugs or parts 4, 5. The skirt or slipper 10 may be constructed of this shape by being drawn or extruded, or stamped, or pressed, or alternatively the skirt or slipper 10 may be cast. If drawn or extruded it will enable it to be made very thin and light without being weak, and further, it would be a very cheap and accurate way of making the same. The surface of the skirt or slipper 10 is machined or otherwise made to fit the cylinder neatly or with reasonable working clearance, but constructed as shown in the drawings, the machining would be done only over the two diametrically opposed arcuate portions of about 100° each, (which form the portions of the skirt or slipper 10 of cylindrical shape) leaving the remainder, or more or less flattened diametrically opposed portions 12, 13, well clear of the cylinder walls 3—see Figs. 2 and 4.

In assembling the parts the skirt or slipper 10 is slid over the two lugs or parts 4, 5, the longitudinal ribs or projections 11 accurately fitting the longitudinal grooves or recesses 9 in said lugs or parts 4, 5. When the skirt or slipper 10 is in position on the lugs or parts 4, 5, it forms a retaining means for the gudgeon-pin 8, which can therefore be of the "full floating" type.

For the purpose of attaching the skirt or slipper 10 to the lugs or parts 4, 5, I may, as shown in the drawings, provide screws 14 screwed into holes 15 provided in the lugs 4, 5, between the bosses 6, 7, forming the bearings for the gudgeon-pin 8, and the head portion 1; bolts 16 engaging in coincident holes 17 in the skirt or slipper 10 and the lugs or parts 4, 5, below the bosses 6, 7; and set screws 18 screwed into the lower ends of the lugs or parts 4, 5, and engaging in correspondingly positioned holes 19 in the lower end of the skirt or slipper 10. The skirt or slipper 10 is constructed with open-ended slots 20 so that it can be pushed over the screws 14 and under the heads thereof, as indicated at 21. The screws 14 and set screws or studs 18 are shown additionally secured in position by splitting the inner ends thereof and bending or riveting the same over. The nuts 22 on the bolts 16 may be further secured by means of the split pins 23. It will be understood that the screws 14 and set screws or studs 18 are permanently fixed to the lugs 4, 5, and that the bolts 16 are removable. In order to place the skirt or slipper 10 in position it is pushed over the lugs or parts 4, 5, until the skirt or slipper 10 engages the heads of the screws 14 beyond the inner ends of the slots 20. In this position the studs 18 will engage in the holes 19 in the lower end of the skirt or slipper 10. The skirt or slipper 10 is finally secured in this position by means of the bolts 16.

As will be understood, if the head or crown 1 expands it will push the skirt or slipper 10 out in a direction parallel to the axis of the gudgeon-pin 8, but the portions of the skirt or slipper 10 lying beyond the ends of the gudgeon-pin 8 are clear of the cylinder walls 3, whereas the other and wearing portions of the skirt or slipper 10 may actually be drawn in slightly by this tendency to make the skirt or slipper oval. This will obviate any tendency to seizure in the cylinder. The wearing faces of the skirt or slipper 10 are quite clear of the head or crown 1, that is to say a space 24 is left or provided between their adjacent inner ends.

Further advantages accruing to a piston constructed as above described are as follows:—Oil holes 25 can be drilled in or on top of the gudgeon-pin bearings or bushings, which cannot be done with the ordinary form of piston; and excess oil can escape from the cylinder walls 3 between the adjacent ends of the head 1 and skirt or slipper 10 through the space 24.

What I claim as my invention and desire to protect by Letters Patent is:—

1. A piston for internal combustion engines, comprising a head portion made of a light metal or alloy and provided with projecting parts, piston rings arranged around said head, and a skirt, made of a hard and strong metal or alloy, arranged around and detachably connected to said head portion, the skirt being fashioned with inwardly directed longitudinal projections forming recesses at the outside and the projecting parts with grooves adapted to be engaged by said projections, the means for detachably connecting the skirt to the head being positioned in the recesses, as set forth.

2. A piston for internal combustion engines, comprising a head portion made of a light metal or alloy and provided with projecting parts, piston rings arranged around said head, a skirt, made of a hard and strong metal or alloy, arranged around and detachably connected to said projecting parts, the skirt being fashioned with inwardly directed longitudinal projections forming recesses at the outside and the projecting parts with grooves adapted to be engaged by said projections, and means for detachably connecting the skirt to the head comprising screws fixed in the projecting parts and engaging with slots in the skirt, bolts passing through said projecting parts and skirt, and studs fixed in the projecting parts and engaging in holes in the skirt, as set forth.

3. A piston for internal combustion engines, comprising a head portion made of a light metal or alloy and provided with projecting parts, piston rings arranged around said head, and a skirt, made of a hard and strong metal or alloy, arranged around and attached to said projecting parts, the projecting parts and the skirt being provided at diametrically opposite points, the one with longitudinal ribs, and the other with complementary longitudinal recesses adapted to be engaged by said ribs, as set forth.

4. A piston for internal combustion engines, comprising a head portion made of a light metal or alloy and provided with projecting parts, piston rings arranged around said head, a gudgeon-pin carried by and between said projecting parts, and a skirt, made of a hard and strong metal or alloy, arranged around and detachably connected to said projecting parts and completely enclosing the gudgeon-pin, said skirt being of uniform cross-section and fashioned with more or less flattened portions beyond the ends of the gudgeon-pin, and the parts of the skirt intermediate said flattened portions being made to fit the cylinder, as set forth.

In testimony whereof I have signed my name to this specification.

PHILIP KEITH SAUNDERS.